United States Patent [19]

Crow et al.

[11] Patent Number: 5,015,894
[45] Date of Patent: May 14, 1991

[54] UNIT BEARING LEADLESS MOTOR

[75] Inventors: William D. Crow, St. Louis; Ronald D. Williams, St. Charles, both of Mo.

[73] Assignee: Emerson Electric Co., St. Louis, Mo.

[21] Appl. No.: 479,285

[22] Filed: Feb. 13, 1990

[51] Int. Cl.⁵ .......................................... H02K 11/00
[52] U.S. Cl. ...................................... 310/71; 310/42; 310/89; 439/353; 439/568
[58] Field of Search ................. 310/71, 89, 42, 91, 310/254, 261; 439/350, 353, 354, 357, 358, 452, 439, 567, 568

[56] References Cited

U.S. PATENT DOCUMENTS

| 4,056,749 | 11/1977 | Carlson, Jr. | 310/71 |
| 4,104,484 | 8/1978 | Ijistra | 310/71 |
| 4,451,750 | 5/1984 | Heuer | 310/71 |
| 4,513,214 | 4/1985 | Dieringer | 310/71 |
| 4,866,317 | 9/1989 | Katayama | 310/71 |
| 4,894,571 | 1/1990 | Hildebrandt | 310/71 |
| 4,924,124 | 5/1990 | Kato | 310/71 |
| 4,925,398 | 5/1990 | Samejima | 439/550 |

Primary Examiner—R. Skudy
Attorney, Agent, or Firm—Polster, Polster and Lucchesi

[57] ABSTRACT

A dynamoelectric machine (10) has no external leads. A stator assembly (12) includes at least one set (14) of electrical windings (16) terminable at each end. A rotor assembly (18) includes a rotatable shaft (22) and the stator and rotor assemblies are installed in a housing (24). A terminal block (38) is internal of the housing and the ends of the winding set are terminated in this block. The housing has an opening (114) therein through which the termination unit is accessible. A receptacle (102) to which external electrical wires (W1, W2) are connected is matingly connectable to the material block through the opening to connect the machine to the external electrical wires.

12 Claims, 3 Drawing Sheets

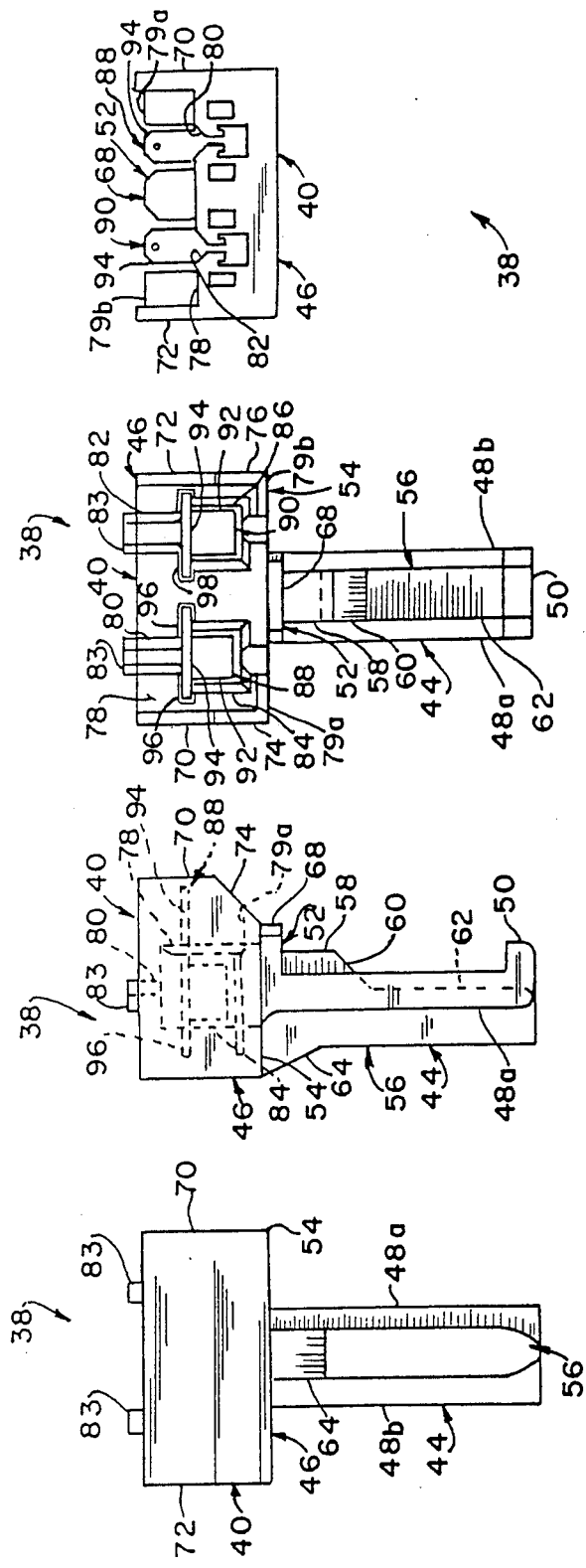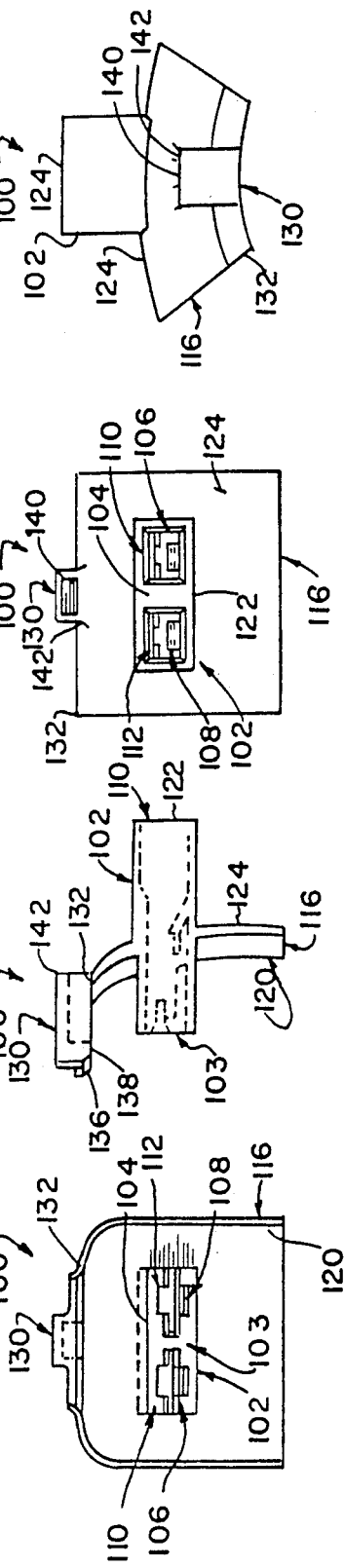

UNIT BEARING LEADLESS MOTOR

BACKGROUND AND SUMMARY OF THE INVENTION

This invention relates to dynamoelectric machines and more particularly, to a leadless electric motor.

In the manufacture of dynamoelectric machines such as electric motors, electrical leads, especially long electrical leads add to the cost of the motor. This is because their presence inhibits automation of the motor manufacturing process. Elimination of leads could facilitate automation and reduce manufacturing costs. In a machine of this design, electrical leads could be fabricated at any point in the manufacturing process and then shipped separately to the customer for later attachment to the motor at the use site.

Consequently, it is an object of the present invention to provide a dynamoelectric machine such as an electric motor; the provision of such a motor which is a leadless electric motor; i.e., a motor having no external electrical leads; the provision of such an electric motor whose manufacture is readily automated to reduce cost of the motor; the provision of such an electric motor to include a terminal block affixable to the motor's stator with electrical leads normally extending from the motor being terminated at the terminal block; the provision of such a motor having a receptacle mating with the terminal block for an electrical power cord or the like to be attachable to the motor at its place of use; and, the provision of such a motor to come in more than one horse-power rating and to be of various sizes and shapes.

Briefly, a dynamoelectric machine of the present invention such as an electric motor has no external leads. The motor comprises a stator assembly including at least one set of electrical windings terminable at each end, a rotor assembly including a rotatable shaft, and a housing in which the stator and rotor assemblies are installed. A terminal block is located internal of the housing and the ends of the winding set are terminated in the block. The housing has an opening therein through which the terminal block is accessible. A receptacle to which external electrical wires are attachable is matingly connectable to the terminal block through the opening to connect the motor to external electrical wires. Other objects and features will be in part apparent and in part pointed out hereinafter.

BRIEF DESCRIPTION OF THE DRAWINGS

FIGS. 3a-3c are respective rear, side, and front elevational views of a terminal block used in the motor, and FIG. 3d is a top plan view of the terminal block;

FIGS. 4a-4c are respective rear, side, and front elevational views of a receptacle which connects with the terminal block, and FIG. 4d is a top plan view of the receptacle; and, FIG. 5 is an exploded perspective view illustrating installation of the terminal block in the motor and connection of the receptacle and terminal block.

Corresponding reference characters indicate corresponding parts throughout the several views of the drawings.

DESCRIPTION OF A PREFERRED EMBODIMENT

Figure 1:
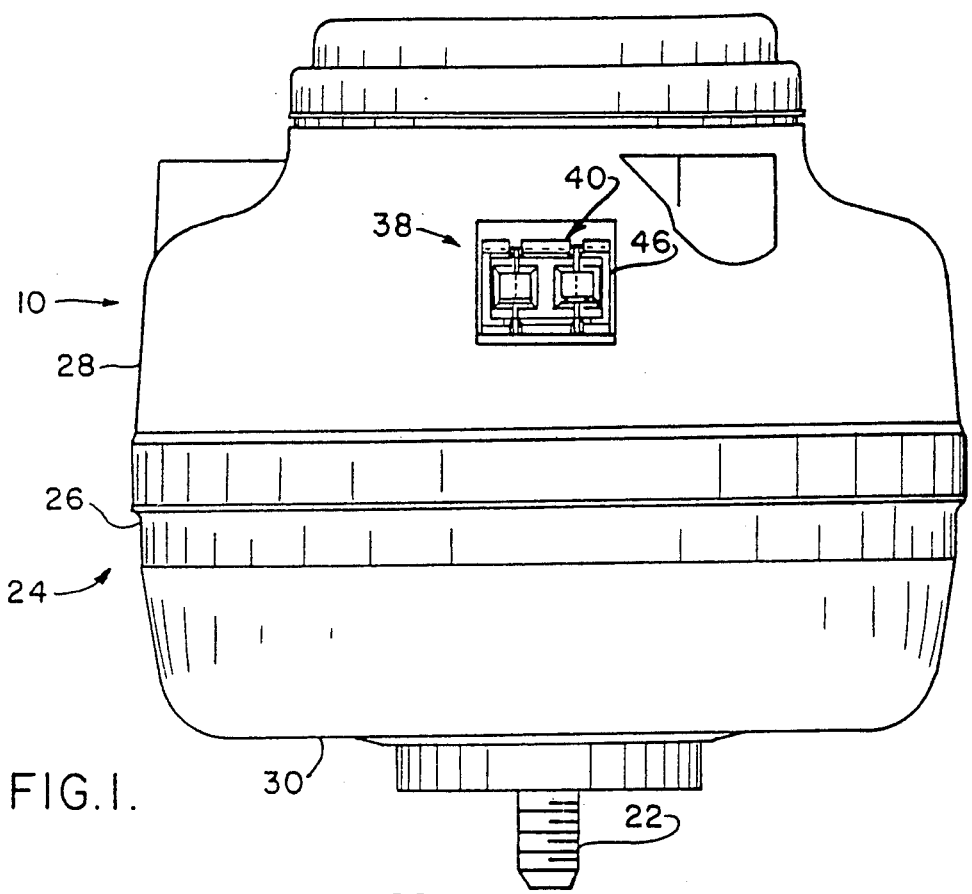
FIG. 1 is an elevational view of a dynamoelectric machine of the present invention comprising a leadless electric motor.
Figure 2:
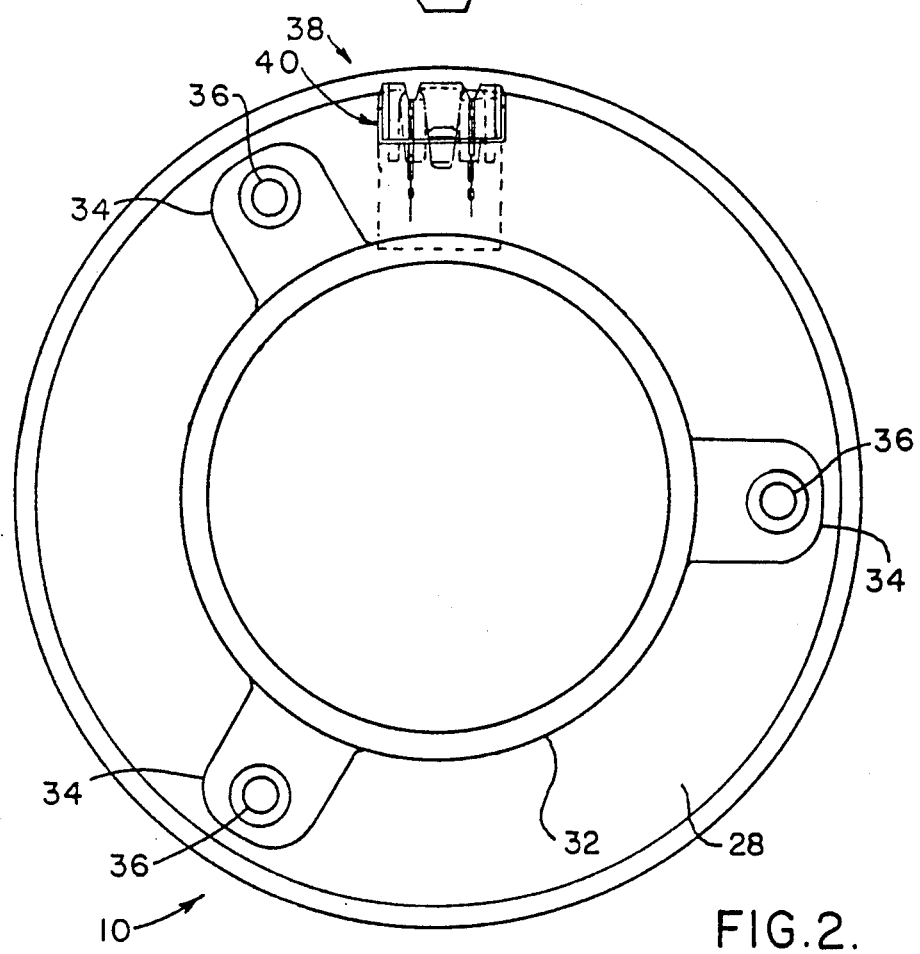
FIG. 2 is an end view of the motor.

Referring to the drawings, a dynamoelectric machine, for example, an electric motor, is indicated generally 10. Motor 10 includes a stator assembly 12 including at least one set 14 of electrical windings 16 (see FIG. 5). The motor also includes a rotor assembly 18 including a rotor 20 and a rotatable shaft 22. The stator and rotor assemblies are conventionally installed in a motor housing 24 which includes a central, generally cylindrical housing section 26 and end shields 28 and 30 which ar attached to the respective ends of section 26. End shield 30 has a central opening through which one end of shaft 22 extends for the shaft to be connected to an external piece of equipment (not shown). As shown in FIG. 1, both end shields have a curved outer surface, the curvature being both longitudinally and circumferentially about the motor. End shield 28 includes a segment 32 from which tabs 34 outwardly project. Three such tabs 34 are shown in FIG. 2, the spacing between the tabs being 120°. Each tab has a hole 36 for a mounting bolt (not shown) by which the motor can be attached to a fixture (also not shown).

It is a feature of motor 10 that it does not include external electrical leads by which an electric motor is typically interconnected with a power cord P or the like. It has been found that the presence of such leads, particularly long leads, impedes automation of motor manufacture and adds to motor cost. Motor 10 is, therefore, a leadless electric motor and includes a terminal means 38 in which the ends of the winding set are terminable. It will be understood that the stator assembly may employ more than one winding set and the ends of the various windings comprising these sets are interconnected in any manner well-known in the art so only two electrical leads are terminable in means 38.

Figure 5:
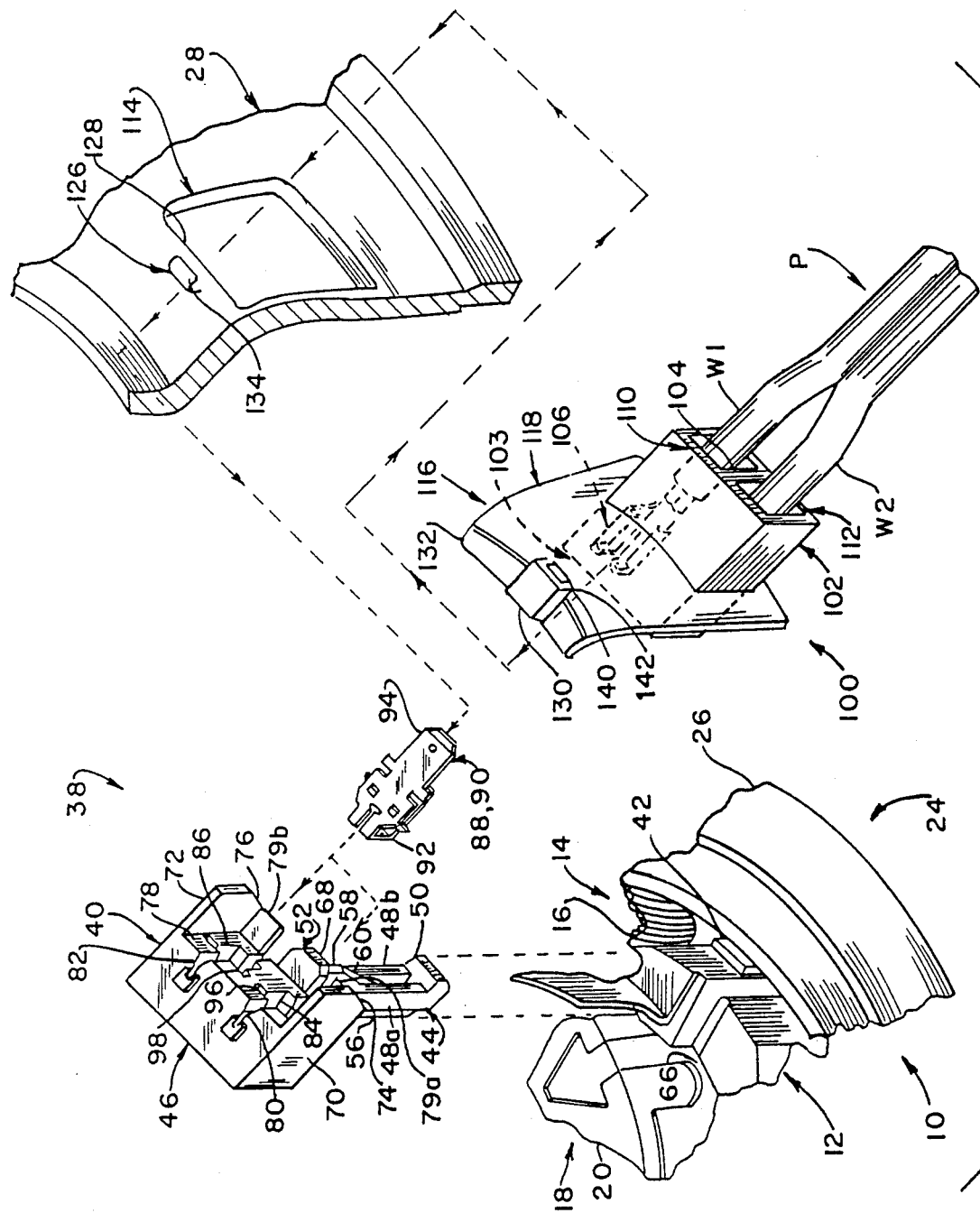

Means 38 includes a terminal block 40 mounted internally within motor housing 24; and specifically, adjacent a portion of the sidewall of end shield 28. As shown in FIG. 5, a post 42 is formed on the inner face of the motor housing section 26 adjacent the sidewall. Specifically, the post is at the end of the section over which end shield 28 is installed and the post extends parallel to the longitudinal axis of the motor. Terminal block 40 has a projection or stem 44 extending from the underside of a main section 46 of the block. This stem snap fits onto post 42 to lock the terminal block in place. The width of this stem is less than the width of section 46. The stem has spaced apart, parallel legs 48a, 48b respectively. These are joined at the distal end of the stem by a base piece 50. The legs are also joined to a cross-piece 52 at the upper end of the stem. This cross-piece is adjacent bottom wall 54 of the main portion of the terminal block.

The stem further includes a center section 56 intermediate the legs and extending the length thereof. As shown in FIG. 3b, the upper end of this center section has an upper portion 58 which projects forwardly of the front face of the legs 48a, 48b. It further has an intermediate rearwardly sloping section 60 whose lower end is recessed between the legs. Finally, there is a lower, recessed portion 62 which extends down to base piece 50. Center section 56 extends rearwardly of the back end of legs 48a, 48b for the entire length of the stem. The upper, rear end of the center section slopes forwardly for a portion of the length of the section as indicated at 64. As shown in FIG. 5, stator assembly 12 has a radial gap 66 and the width of stem center section 56 corresponds to the width of the gap for the stem to be inserted in the gap. When so placed, the rear face of legs 48a, 48b bear against the portion of the outer face of the stator assembly adjacent the gap. Cross-piece 52 has a forwardly projecting center portion defining a tongue 68. Post 42 is positioned radially outwardly of gap 66 so to facilitate locking the terminal block in place.

Main section 46 of the terminal means has sidewalls 70, 72 spaced apart a distance greater than the width of post 42. The sidewalls also extend out beyond the front face of tongue 68. Each sidewall has a rearwardly sloping front end face 74, 76 respectively, the faces sloping rearwardly from approximately the mid-point of the face to a point parallel with the front end of tongue 68. Section 46 has a front face 78 recessed a substantial distance inwardly from the front end of the sidewalls. The front face is also rearward of the front end of the tongue. Respective skirts 79a, 79b extend inwardly from the base of the inner face of the respective sidewalls across the bottom of the front face. The width of these skirts is such as to leave a gap between their inner ends and the sides of tongue 68.

A pair of vertical slots 80, 82 extend inwardly from the front face of the terminal section, the slots extending the height of the section. The recesses thereby formed extend back approximately one-half the length of the section. The portion of the front face of section 46 adjacent each side of each slot is beveled to form inwardly sloping sidewalls for the slot at the outer end of the recesses. The centerline of the slots are equidistantly spaced on either side of the centerline of section 46. The respective ends of winding set 14 are inserted in the respective slots during fabrication of the motor. A guide 83 extends above the top surface of section 46 at the upper end of each slot and at the inward end of the recess formed by the slot.

Rectangular shaped cavities 84, 86 are also formed in the front face of section 46. The cavities are side-by-side cavities spaced equidistantly on either side of the centerline of the front face of section 46. As a consequence, the respective slots extend into their associated cavities. The depth of the cavities is greater than the length of the recesses formed by the slots and the width of the cavities is greater than the width of the slots. The slots are sized to accommodate respective male electrical terminals 88, 90. These are push-in terminals which, when installed in their respective cavities, capture the ends of the windings in the cavities and form an electrical connection with them. As shown in FIG. 5, each terminal is generally L-shaped with a leg section 92 whose height generally corresponds to that of the cavities, and a flat prong section 94 the length of which is such the outer end of the terminal extends outwardly beyond the front face of section 46. However, the forward end of the sidewalls extend beyond the outer end of the terminals. The rear portion of the prong section is wider than the forward end thereof and the cavities each have a horizontal slot 96, 98 respectively, for receiving this wider portion. During motor fabrication, the respective ends of a winding are inserted in the respective slots prior to insertion of the terminals. The completed terminal assembly is then inserted in the gap 66 and locked onto post 42. No external leads extend from the motor.

Motor 10 next includes a receptacle means 100 which is connectable to the terminal means. Means 100 has an electrical receptacle 102 for terminating the ends of insulated wires W1 and W2 which comprise power cord P. Receptacle 102 is hollow and of an elongate, generally rectangular shape. The width and height of the receptacle are such that its forward end 103 will fit between sidewalls 70, 72 of the terminal block. The receptacle has a central, longitudinal divider 104 extending the length of the receptacle and dividing it into two compartments. A pair of female electrical terminals 106, 108 are housed in these compartments which are designated 110 and 112 respectively. The terminals are positioned at the forward end of their respective compartments so to matingly connect with male terminals 88, 90 of the terminal means.

An opening 114 is formed in end shield 28 adjacent the location of the terminal means. The opening is generally rectangular and is sized to permit the forward end of receptacle 102 to be inserted through it. The receptacle means further includes a cover plate 116 fitting over opening 114. The plate has a curved surface 118 the curvature of which corresponds to that of the end shield in the area of opening 114. Thus surface 118 is curved both from side-to-side and from top-to-bottom as viewed in the drawings. The receptacle is centered with respect to the cover plate and the dimensions of the cover plate correspond to those of the opening for the plate to be received in the opening when receptacle 102 is inserted into it. Inner end 103 of the receptacle thus projects inwardly from an inner face 120 of the cover plate while a rear face 122 of the receptacle projects outwardly from a rear face 124 thereof. It will be understood that the receptacle and cover plate could be integrally formed; or, the cover plate may have a rectangular opening sized to receive the receptacle. A locking mechanism such as a flexible tab or the like would serve to latch the receptacle and cover plate together as a single unit.

Referring to FIG. 5, an ear 126 is formed on end shield 28 adjacent opening 114. The location of the ear is at a point approximately half-way along a side 128 of the opening. A latch member 130 is located at one end of the cover plate for latching with the ear when the receptacle is inserted into the opening. This serves to lock the receptacle in place. The latch member is generally rectangular in shape and formed at the upper end 132 of the cover plate, as viewed in FIG. 4b. The outer face of the ear is chamfered as indicated at 134 to form a ramp surface. The lower frontal portion of the latch member is similarly sloped, as indicated at 136, to facilitate movement of the latch member over the ear when the receptacle is inserted into the opening. The underside 138 of the latch member, adjacent its forward end, forms a ledge or shelf which rides over the ear. The latch member is hollow behind this forward end to capture the ear. This hollow section extends rearwardly the length of the latch member and forms a rectangular slot 140 in the rear face 142 thereof.

In use, when receptacle 102 is inserted into opening 114, the front end of the receptacle slides between the sidewalls of the terminal block. Terminals 106, 108 in the receptacle fit onto terminals 88, 90 of the terminal block to complete an electrical connection between the motor and the power source. The bottom of the receptacle rests on tongue 68 when the receptacle is so installed. The cover plate is received in the opening as the receptacle is fitted into place and the latch member snaps over the ear to lock the assembly together. It is a feature of the invention that the shape of the opening and the curvature of the cover plate are such as to ensure the receptacle fits into the opening only one way.

Previously, a dynamoelectric machine such as motor 10 required external leads which were connected to a terminal strip or otherwise connected to a source of electrical power in order to run the motor. Now, the end user only has to attach the receptacle to the motor to connect it to any convenient source of electrical power. The manufacturing operation is simplified because the wiring for the motor is simplified and this reduces manufacturing time and lowers costs. It will be appreciated that the connection of the receptacle to the motor need not be permanent. If, for example, it is decided to use the motor with a different length power cord, or one having a different plug for the electrical outlet, the user need only unsnap the latch member from the ear, withdraw the receptacle from the opening and insert the receptacle for the new power cord into the opening in the side of the machine.

Having thus described the invention, what is claimed and desired to be secured by Letters Patent is:

1. A dynamoelectric machine having no external leads comprising:
    a stator assembly including at least one set of electrical windings terminable at each end;
    a rotor assembly including a rotatable shaft;
    a housing in which the stator and rotor assemblies are installed;
    termination means internal of the housing in which the ends of the set of windings are terminated, the housing having an opening therein through which the termination means is accessible; and,
    receptacle means to which external electrical wire are attachable, the receptacle means being matingly connectable with the termination means through the opening to connect the dynamoelectric machine with the external electrical wires, the housing including an end shield at at least one end of the housing, the opening being in the end shield, and the end shield having a curved outer surface adjacent the opening, and the receptacle means including an electrical receptacle having a curved surface corresponding to the curvature thereof.

2. The dynamoelectric machine of claim 1 further including latch means for latching the receptacle in place when mated with the termination means.

3. The dynamoelectric machine of claim 2 wherein the latch means includes an ear formed on an outer surface of the end shield adjacent the opening and the receptacle includes a latch member which fits over the ear as the receptacle is mated with the termination means to lock the receptacle in place.

4. The dynamoelectric machine of claim 3 wherein the receptacle means includes a pair of electrical terminals to which ends of wires for an electrical cord are attached and a receptacle housing in which the terminals are installed.

5. The dynamoelectric machine of claim 4 wherein the receptacle includes a curved cover plate in which the latch member and receptacle housing are formed, the curvature of the plate corresponding to the curvature of the end shield, the size of the late being such as to fit into the opening when the receptacle is installed in the terminal block.

6. A dynamoelectric machine having no external leads comprising:
    a stator assembly including at least one set of electrical windings terminable at each end;
    a rotor assembly including a rotatable shaft;
    a housing in which the stator and rotor assemblies are installed;
    termination means internal of the housing in which the ends of the windings are terminated, the housing having an opening therein through which the termination means is accessible and the termination means including a terminal block having at least two electrical terminals, one for terminating each end of the set of electrical windings;
    receptacle means to which external electrical wires are attachable, the receptacle means being matingly connectable with the termination means through the opening to connect the dynamoelectric machine with the external electrical wires; and,
    means for locating the terminal block adjacent the opening, said locating means including a post inside the housing adjacent the opening and the terminal block including means for attachment to the post.

7. The dynamoelectric machine of claim 6 wherein the attachment means includes a stem extending downwardly from a base of the terminal block, the stem having a notched section fitting about the post to attach the terminal block to the post and hold it in place.

8. The dynamoelectric machine of claim 6 wherein the terminal block includes a pair of of electrical terminals and side-by-side cavities in which the terminals are seated, the respective ends of the windings being inserted in the cavities and electrically connected to the terminals when they are seated therein.

9. The dynamoelectric machine of claim 8 wherein the receptacle means includes an electrical receptacle and the terminal block includes guide means for connecting the receptacle and the terminal block.

10. The dynamoelectric machine of claim 9 wherein the sidewalls of the terminal block extend outwardly beyond a front face of the block and the width of the receptacle is such as to fit between the sidewalls when the block and receptacle are connected for the sidewalls to guide movement of the receptacle.

11. The dynamoelectric machine of claim 10 wherein the guide means further includes a tongue extending forwardly from a base of the terminal block, the underside of the receptacle sliding over the tongue as the receptacle is mated with the terminal block.

12. The dynamoelectric machine of claim 11 wherein the terminals in the terminal block are male terminals and the receptacle includes mating female terminals.

* * * * *